(12) United States Patent
Fujii et al.

(10) Patent No.: US 8,377,242 B2
(45) Date of Patent: Feb. 19, 2013

(54) PROCESS FOR MANUFACTURING A DECORATIVE MEMBER WITH A GROOVE IN A MOLD

(75) Inventors: Tetsuya Fujii, Aichi-ken (JP); Chiharu Totani, Aichi-ken (JP); Takayasu Ido, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 712 days.

(21) Appl. No.: 12/457,831

(22) Filed: Jun. 23, 2009

(65) Prior Publication Data

US 2010/0028610 A1 Feb. 4, 2010

(30) Foreign Application Priority Data

Jul. 30, 2008 (JP) ................................. 2008-196459

(51) Int. Cl.
*B29C 45/14* (2006.01)
*B29C 45/16* (2006.01)
(52) U.S. Cl. ........................................ 156/219; 156/245
(58) Field of Classification Search .................. None
See application file for complete search history.

(56) References Cited

U.S. PATENT DOCUMENTS

| | | | | |
|---|---|---|---|---|
| 3,399,101 A * | 8/1968 | Magid | ............................ | 428/159 |
| 6,197,397 B1 * | 3/2001 | Sher et al. | .................... | 428/42.3 |
| 6,676,791 B1 * | 1/2004 | Kondo et al. | ................ | 156/209 |
| 6,961,023 B2 | 11/2005 | Fujii et al. | | |
| 7,295,166 B2 | 11/2007 | Fujii et al. | | |
| 2005/0237261 A1 * | 10/2005 | Fujii et al. | ..................... | 343/872 |
| 2007/0109206 A1 | 5/2007 | Fujii et al. | | |
| 2008/0233367 A1 | 9/2008 | Maeda et al. | | |
| 2008/0309579 A1 | 12/2008 | Maeda et al. | | |

FOREIGN PATENT DOCUMENTS

| | | |
|---|---|---|
| JP | A-2006-095793 | 4/2006 |
| JP | A-2007-013722 | 1/2007 |

OTHER PUBLICATIONS

Office Action dated Dec. 21, 2010 issued in corresponding JP application No. 2008-196459.

* cited by examiner

*Primary Examiner* — Barbara J. Musser
(74) *Attorney, Agent, or Firm* — Posz Law Group, PLC (57) ABSTRACT

A decorative member includes a transparent layer, a first decorated layer, and a second decorated layer. The first decorated layer is disposed on the transparent layer's rear surface. The second decorated layer is disposed on the transparent layer's rear surface. The transparent layer's rear surface has an irregular configuration that includes indented portions and indent-free portions. The indented portions dent toward the transparent layer's front surface. The indent-free portions protrude toward the transparent layer's rear surface. The first decorated layer is disposed directly on the rear surface of the transparent layer partially. The second decorated layer is made of a film that includes resin, and is laminated on the first decorated layer and on the transparent layer's rear surface entirely.

11 Claims, 8 Drawing Sheets

PROCESS FOR MANUFACTURING A DECORATIVE MEMBER WITH A GROOVE IN A MOLD

INCORPORATION BY REFERENCE

The present invention is based on Japanese Patent Application No. 2008-196,459, filed on Jul. 30, 2008, the entire contents of which are incorporated herein by reference.

BACKGROUND OF THE INVENTION

1. Field of the Invention

The present invention relates to a decorative member that displays predetermined design or decoration stereoscopically or three-dimensionally, and to a process for manufacturing the same.

2. Description of the Related Art

Decorative members that display predetermined decorations three-dimensionally have been known. This type of decorative members (hereinafter simply referred to as "decorative members") has been used in emblems and electromagnetic-wave transmissive covers for vehicle. In general, such a decorative member comprises a transparent layer, and a decoration layer that is disposed on the rear surface of the transparent layer. The rear surface of the transparent layer is formed as an irregular configuration. The decoration layer is formed as another irregular configuration that coincides with that of the transparent layer's rear surface. The decoration layer that takes on the irregular configuration makes the decorative member display predetermined decoration three-dimensionally.

Figure 12:
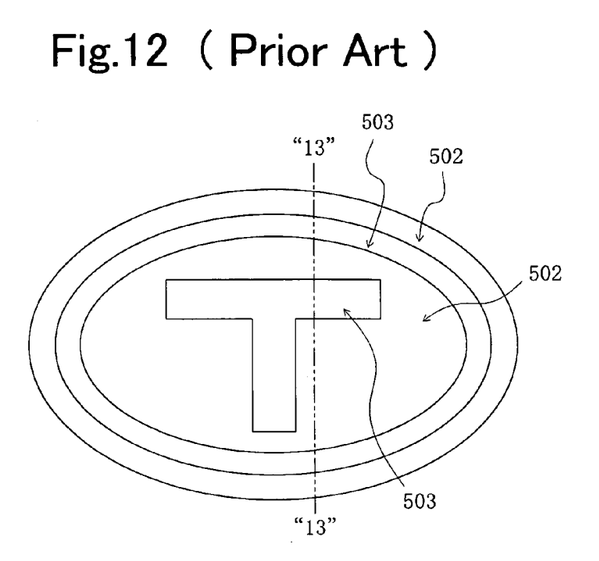
FIG. 12 is a front-view diagram for schematically illustrating a conventional decorative member.
Figure 13:
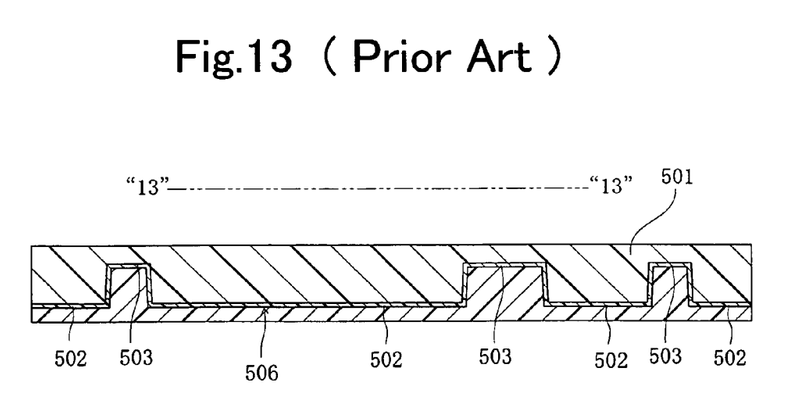
FIG. 13 is a cross-sectional diagram for schematically illustrating the conventional decorative member when it is cut with the imaginary chain double-dashed line "13"-"13" designated in FIG. 12.
Figure 14:
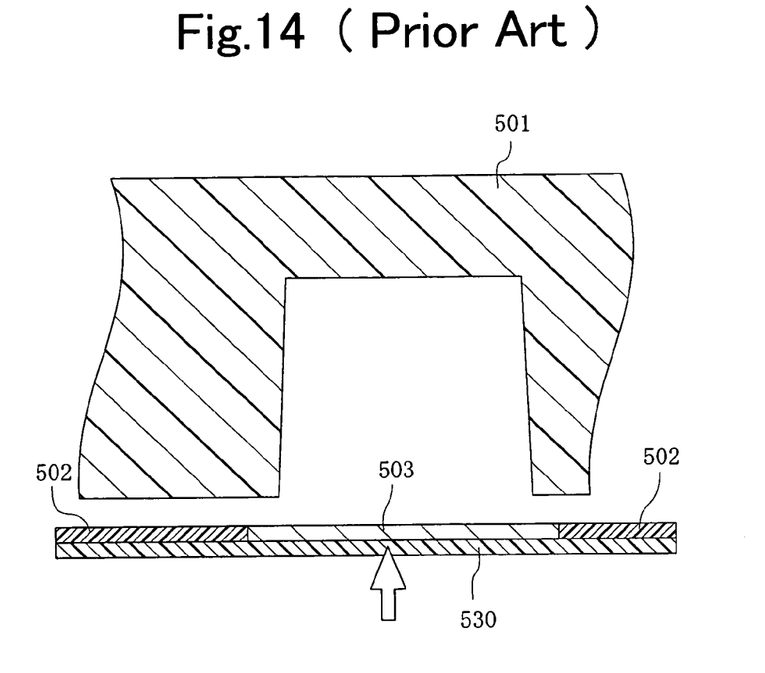
FIG. 14 is an explanatory cross-sectional diagram for schematically illustrating how the conventional decorative member is manufactured.
Figure 15:
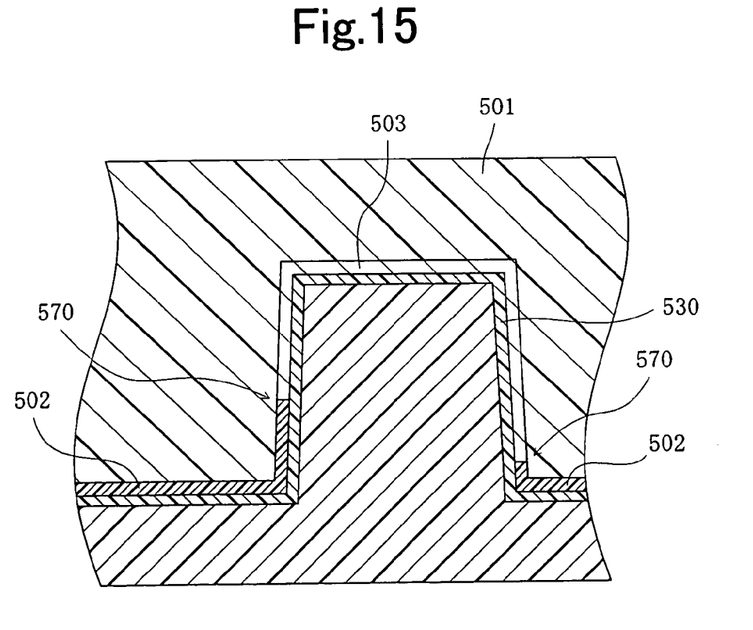
FIG. 15 is another explanatory cross-sectional diagram for schematically illustrating how the conventional decorative member is manufactured.

Note that the decoration layer in a conventional decorative member is usually made of two or more layers in order to display the predetermined decoration. For example, an ordinary conventional decorative member is illustrated FIGS. 12 and 13. FIG. 12 illustrates a front view of the conventional decorative member schematically. FIG. 13 illustrates a cross-sectional view of the conventional decorative member, which is shown in FIG. 12 and is cut along the imaginary chain double-dashed line "13"-"13" designated in FIG. 12, schematically. Moreover, FIGS. 14 and 15 are explanatory diagrams for schematically illustrating how the conventional decorative member is manufactured, respectively. Hereinafter, the conventional decorative member will be described with reference to FIGS. 12 through 15.

As illustrated in FIG. 13, the conventional decorative member comprises a transparent layer 501, and a decoration layer 506. The decoration layer 506 has first decorated layers 502, and second decorated layers 503. The first decorated layers 502 and second decorated layers 503 are formed on the rear surface of the transparent layer 501 partially. Moreover, as shown in FIG. 12, the first decorated layers 502, and the second decorated layers 503, which are placed in the space between the first decorated layers 502 and in the middle of the conventional decorative member, are visible when a viewer views the conventional decorative member on the front-surface side, namely, on the side of the transparent layer 501. Accordingly, the conventional decorative member displays predetermined decoration that results from the first decorated layers 502 and second decorated layers 503. Moreover, the decoration layer 506 is formed as an irregular configuration that coincides with that of the transparent layer 501's rear surface, as illustrated in FIG. 13. Consequently, the conventional decorative member displays the predetermined decoration three-dimensionally with the decoration layer 506's irregular configuration. In general, the first decorated layers 502 are formed by means of application, and the second decorated layers 503 are formed by means of deposition or application. Note that the term, "application" being referred to in the present specification, implies a concept that involves not only coating but also printing.

Note that the following two methods have been available to give such an irregular configuration to the decoration layer 506. As for a first method, a material for making the decoration layer 506 is applied or vapor deposited onto the rear surface of the transparent layer 501, thereby forming the decoration layer 506 as an irregular configuration that coincides with the rear surface of the transparent layer 501. When forming the second decorated layers 503 by means of vapor deposition in accordance with the first method, it is believed allowable to form the first decorated layers 502 by means of application onto the rear surface of the transparent layer 501 and then form the second decorated layers 503 onto the resulting first decorated layers 502 by means of vapor deposition as an upper layer to the first decorated layers 502. However, this first method requires to put the transparent layer 501 with the first decorated layer 502 formed into a vacuum chamber for vapor deposition in the course of forming the second decorated layers 503. Accordingly, there arises such a problem that the manufacturing steps for completing decorated member might have become complicated. On the other hand, it is not needed to put the transparent layer 501 into a vapor-deposition vacuum chamber when forming the second decorated layers 503 by means of application. However, since the transparent layer 501 takes on an irregular configuration, it might be difficult to form the second decorated layers 503 highly accurately by means of application, depending on positions at which the second decorated layers 503 are formed. Consequently, when forming the second decorative layers 503 by means of application in accordance with the first method, it might have been less likely to manufacture decorative members that are good in terms of decorativeness. Moreover, such a first method might have required troublesome manufacturing steps in order to form the second decorated layers 503 with high accuracy by means of application.

A second method of giving an irregular configuration, which coincides with the rear surface of the transparent layer 501, to the decoration layer 506 is a method of laminating a decoration layer 506 that comprises a film onto the rear surface of the transparent layer 501, as disclosed in Japanese Unexamined Patent Publication (KOKAI) Gazette No. 2006-95,793, for instance. As illustrated in FIGS. 14 and 15, a film is used in the laminating method. The film is made of a resinous layer 530, and the first decorated layer 502 and second decorated layer 503 that are formed in advance as an upper layer to the resinous layer 530. Accordingly, it is believed that the laminating method hardly requires complicated manufacturing steps when forming the second decorated layer 503 either by means of vapor deposition or by means of application. That is, it is not needed to put the transparent layer 501 itself into a vacuum chamber for vapor deposition when forming the second decorated layer 503 by means of vapor deposition. Moreover, it is possible to form the second decorated layer 503, an upper layer, by means of application onto the flat resinous layer 530. Consequently, the laminating method is believed to enable manufacturers to readily manufacture decorative members.

However, in the laminating method, it is required to shape the resulting decoration layer 506, a film, into a configuration that develops so as to coincide with the rear surface of the transparent layer 501. When shaping the decoration layer 506 into such a configuration, it undergoes elongation deformation so that it turns into a configuration that coincides with the rear surface of the transparent layer 501. Therefore, as illustrated FIG. 15, the boundary sections between the first decorated layer 502 and the second decorated layer 503 (hereinafter, referred to as "break or separation lines" 570) might suffer from positional deviation or displacement, depending on an extent of the elongation deformation that the decoration layer 506 undergoes. To put it differently, the laminating method might not allow a manufacturing worker or robot to position the break or separation lines 570 highly accurately. As a result, completed decorative members might exhibit deteriorated decorativeness.

Because of the problems as described above, manufacturers have been therefore seeking such a technique that makes it possible to readily manufacture decorative members, and to improve the decorativeness of resulting decorative members furthermore.

SUMMARY OF THE INVENTION

The present invention has been developed in view of the aforementioned circumstances. It is therefore an object of the present invention to provide a decorative member that can not only be manufactured with ease but also exhibits good decorativeness, and a process for manufacturing the same.

A process for manufacturing decorative member according to the present invention, process which can solve the above-described problems, is a process for manufacturing decorative member, the decorative member comprising:

a transparent layer having opposite front and rear surfaces;

a first decorated layer being disposed on the rear surface of the transparent layer; and a second decorated layer being disposed on the rear surface of the transparent layer;

the process comprising the steps of:

forming the rear surface of the transparent layer as an irregular configuration that comprises indented portions denting toward the front surface of the transparent layer and indent-free portions protruding toward the rear surface of the transparent layer;

forming the first decorated layer directly onto the rear surface of the transparent layer partially; and making the second decorated layer of a film that comprises resin, and then forming the second decorated layer by means of laminating the resulting film onto the first decorated layer and onto the rear surface of the transparent layer entirely.

The process for manufacturing decorative member according to the present invention can preferably be provided with either one of following optional features (1) through (5). It is more preferable that the present process for manufacturing decorative member can be provided with a plurality of following optional features (1) through (5).

(1) In the present manufacturing process, the second decorated layer can preferably be made of a film that comprises a resinous layer, and a vapor-deposited metallic layer being disposed on the resinous layer; the vapor-deposited metallic layer can preferably comprise at least one member that is selected from the group consisting of tin, indium, aluminum, zinc, gold, silver, copper, titanium, nickel and oxides thereof; and the resinous layer can preferably comprise at least one member that is selected from the group consisting of polyurethane, polymethylmethacrylate, acrylonitrile-butadiene-styrene copolymer, polycarbonate, polyethylene terephthalate, polypropylene, polyethylene and fluorocarbon resin.

(2) In the present manufacturing process, before being laminated onto the first decorated layer and onto the rear surface of the transparent layer, the second decorated layer can preferably comprise: the vapor-deposited metallic layer whose thickness is from 5 nm or more to 80 nm or less; and the resinous layer whose thickness is from 5 μm or more to 300 μm or less.

(3) In the present manufacturing process, at the step of forming the first decorated layer: the first decorated layer can preferably be formed onto at least a part of the indent-free portions of the rear surface of the transparent layer by means of two-color molding; and a rear surface of the first decorated layer can preferably be provided with a groove that dents toward the front surface of the transparent layer, and that is connected to one of the indented portions of the rear surface of the transparent layer.

(4) In the present manufacturing process, the decorative member can preferably further comprise an outer-periphery end surface; and the groove in the rear surface of the first decorated layer can preferably be further connected to the outer-periphery end surface of the decorative member at the step of forming the first decorated layer.

(5) In the present manufacturing process, the step of making and then forming the second decorated layer can preferably comprise the steps of: press contacting at least the transparent layer and the film making the second decorated layer with each other; and moving gas, which remains between the transparent layer and the second decorated layer to inside of the one of the indented portions of the rear surface of the transparent layer, to inside the groove in the rear surface of the first decorated layer.

A decorative member according to the present invention makes it possible to solve the above-described problems, and comprises:

a transparent layer having opposite front and rear surfaces;

a first decorated layer being disposed on the rear surface of the transparent layer; and a second decorated layer being disposed on the rear surface of the transparent layer;

the rear surface of the transparent layer having an irregular configuration that comprises indented portions denting toward the front surface of the transparent layer and indent-free portions protruding toward the rear surface of the transparent layer;

the first decorated layer being disposed directly on the rear surface of the transparent layer partially; and the second decorated layer being made of a film that comprises resin, and being laminated on the first decorated layer and on the rear surface of the transparent layer entirely.

The decorative member according to the present invention can preferably further comprise either one of following optional features (6) through (8). It is more preferable that the present decorative member can further comprise a plurality of following optional features (6) through (8).

(6) The present decorative member can preferably comprise:

the second decorated layer being made of a film;

the film comprising a resinous layer, and a vapor-deposited metallic layer being disposed on the resinous layer;

the vapor-deposited metallic layer comprising at least one member that is selected from the group consisting of tin, indium, aluminum, zinc, gold, silver, copper, titanium, nickel and oxides thereof; and the resinous layer comprising at least one member that is selected from the group consisting of polyurethane, polymethylmethacrylate, acrylonitrile-butadiene-styrene copolymer, polycarbonate, polyethylene terephthalate, polypropylene, polyethylene and fluorocarbon resin.

(7) The present decorative member can preferably comprise:

the first decorated layer being made by means of two-color molding, and being disposed directly on at least a part of the indent-free portions of the rear surface of the transparent layer; and the first decorated layer comprising a rear surface that is provided with a groove denting toward the front surface of the transparent layer and being connected to one of the indented portions of the rear surface of the transparent layer.

(8) The present decorative member can preferably further comprise an outer-periphery end surface; and the groove in the rear surface of the first decorated layer can preferably be further connected to the outer-periphery end surface of the decorative member.

In accordance with the process for manufacturing decorative member according to the present invention, the first decorated layer that makes a part of the decoration layer is formed directly onto the rear surface of the transparent layer. Accordingly, in the resulting subassembly of the decorative member according to the present invention, it is possible to prevent the first decorated layer from deviating or displacing positionally with respect to the transparent layer. Consequently, in the present decorative member, it is possible to inhibit the break or separation line between the first decorated layer and the second decorated layer from deviating or displacing positionally. Thus, the present decorative member is good in terms of decorativeness. Therefore, the present manufacturing process makes it possible to manufacture decorative members that are good in terms of decorativeness.

Moreover, the decorative member according to the present invention comprises the second decorated layer that is made of a film comprising resin. In addition, the second decorated layer is laminated on the first decorated layer and on the rear surface of the transparent layer entirely. As a result, the break or separation line between the first decorated layer and the second decorated layer hardly deviates or displaces positionally if the second decorated layer undergoes elongation deformation when shaping the second decorated layer into a configuration that coincides with or is die-symmetric to the first decorated layer and the transparent layer's rear surface. These arrangements also enable the resulting present decorative member to display enhanced decorativeness. That is, the present manufacturing process enables manufacturers to manufacture decorative members with upgraded decorativeness.

As described above, the second decorated layer comprises a film, and is shaped into such a configuration that coincides with or is die-symmetric to the transparent layer's rear surface that is formed as an irregular configuration. Accordingly, it is easy to form the second decorated layer as an irregular configuration that coincides with or is die-symmetric to the transparent layer's irregular configuration. Moreover, since the second decorated layer that comprises a film is used in the process for manufacturing decorative member according to the present invention, it is not needed to put the transparent layer proper into a vacuum chamber for vapor depositing metal even when a part of the second decorated layer comprises a vapor-deposited metallic layer, a layer that is formed by means of vapor depositing metal, for instance. Consequently, manufacturers can manufacture the decorative member according to the present invention with ease. Thus, the present manufacturing process makes it possible for manufacturers to readily manufacture decorative members that are good in terms of decorativeness.

The process for manufacturing decorative member according to the present invention that is further provided with above-described optional feature (1) makes it possible to inhibit the resulting decorated members from exhibiting degraded decorativeness when the second decorated member undergoes elongation deformation, because at least one member that is selected from the group consisting of tin, indium, aluminum, zinc, gold, silver, copper, titanium, nickel and oxides thereof is used as a material for making the vapor-deposited metallic layer, an element of the film that constitutes the second decorated layer, in the present manufacturing process. Likewise, the decorative member according to the present invention that further comprises above-described optional feature (6) can inhibit the decorativeness from degrading when the second decorated layer deforms to elongate. This advantage, the inhibition of degraded decorativeness, can be produced because of the following reasons.

When the second decorated layer undergoes elongation deformation, the resinous layer, an element of the second decorated layer, first deforms to elongate and then the vapor-deposited metallic layer, another element of the second decorated layer, undergoes elongation deformation to follow the resinous layer that deforms to elongate. If the vapor-deposited metallic layer is formed all over the resinous layer, the vapor-deposited metallic layer might crack when the resinous layer undergoes elongation deformation. However, the vapor-deposited metallic layer that comprises one of the above-described metallic materials scatters on the resinous layer, because the metallic materials are vapor deposited like islets in a dotted manner. Therefore, the vapor-deposited metallic layer that comprises one of the metallic materials is less likely to crack even when the resinous layer deforms to elongate.

Moreover, it is possible to highly accurately shape the second decorated layer into a configuration, which coincides with or is die-symmetric to the first decorated layer but also coincides with or is die-symmetric to the rear surface of the transparent layer, because the resinous layer, an element of the second decorated layer, is made from at least one resinous material that is selected from the group consisting of polyurethane, polymethylmethacrylate, acrylonitrile-butadiene-styrene copolymer, polycarbonate, polyethylene terephthalate, polypropylene, polyethylene and fluorocarbon resin. The highly-accurate formability of the second decorated layer results from the fact that films, which comprise these resinous materials, exhibit good elongation deformability.

For the reasons stated above, the process for manufacturing decorative member according to the present invention that is further provided with above-described optional feature (1) enables manufacturers to manufacture decorative members that are good in terms of decorativeness. Thus, the decorative member according to the present invention that further comprises above-described optional feature (6) can demonstrate upgraded decorativeness.

The process for manufacturing decorative member according to the present invention that is further provided with above-described optional feature (2) makes it possible to optimize the before-lamination thicknesses of the vapor-deposited metallic layer and resinous layer. Accordingly, it is possible to let the resinous layer undergo elongation deformation fully while inhibiting the resinous layer from being broken, ruptured or fractured. Consequently, manufactures can manufacture decorated members that are much better in terms of decorativeness, using the present manufacturing process that is provided with above-described optional feature (2).

The process for manufacturing decorative member according to the present invention that is further provided with above-described optional feature (3) makes it possible to position the first decorated layer with ease and with high accuracy, because the first decorated layer is formed onto the transparent layer's rear surface by means of two-color molding partially on at least a part of the indent-free portions. Moreover, the present manufacturing process makes it possible to inhibit the first decorated layer from coming off from the transparent layer, because forming the first decorated layer onto the transparent layer's rear surface by means of two-color molding makes it possible to integrate the transparent layer and the first decorated layer highly reliably. In addition, the first decorated layer's rear surface comprises the groove that is connected to or communicated with one of the indented portions of the transparent layer's rear surface. Accordingly, gas that remains between the transparent layer and the second decorated layer can move to the inside of the groove. That is, the gas is less likely to remain between the second decorated layer and the transparent layer so that the second decorated layer can come in press contact with the transparent layer firmly. Consequently, the present manufacturing process makes it possible to keep down the deterioration of decorated members' decorativeness, deterioration which arises from the gas that has remained between the transparent layer and the second decorated layer. All in all, the present manufacturing process that is further provided with above-described optional feature (3) makes it possible to manufacture decorative members that are much better in terms of decorativeness. Therefore, the decorative member according to the present invention that further comprises above-described optional feature (7) can demonstrate decorativeness that is upgraded furthermore.

The process for manufacturing decorative member according to the present invention that is further provided with above-described optional feature (4) makes it possible to discharge gas that has gone inside the groove that is disposed in the first decorated layer's rear surface to the outside of resultant decorative members. Accordingly, the present manufacturing process that is further provided with above-described optional feature (4) enables manufacturers to manufacture the decorative member according to the present invention from which gas that remains between the transparent layer and the second decorated layer has been removed with high reliability. Consequently, the present manufacturing process that is further provided with above-described optional feature (4) enables manufacturers to manufacture decorative members that demonstrate much better decorativeness. Thus, the decorative member according to the present invention that further comprises above-described optional feature (7) is upgraded furthermore in terms of decorativeness.

The process for manufacturing decorative member according to the present invention that is further provided with above-described optional feature (5) enables manufacturers to manufacture decorative members that demonstrate much better decorativeness in a fashion similar to that of the present manufacturing process that is further provided with above-described optional feature (4), but more reliably than it does.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

It is possible to make use of a decorative member according to the present invention in a variety of applications or products as the decorative member that displays predetermined decoration. For example, it is allowable to utilize the present decorative member for the following: electromagnetic-wave transmissible covers for covering electromagnetic-wave radar device for vehicle, electromagnetic-wave radar device which beams or transmits millimeter electromagnetic waves, for instance; emblems for vehicle; or switch covers for covering various switches. In any of the aforementioned products that the present decorative member makes, the present decorative member comprises a first decorative layer, which is positioned highly accurately on a transparent layer's rear surface that is formed as an irregular surface, because an extensive film that comprises the first decorated layer is not formed by means of lamination onto the transparent layer's rear surface but the first decorative layer itself is formed directly onto the transparent layer's rear surface partially. That is, a process for manufacturing decorative member according to the present invention makes it possible to give the resultant decorative members good decorativeness, because the present manufacturing process enables a manufacturing worker or robot to highly accurately position the break or separation line that appears between the first decorated layer and a second decorated layer, which is made of a film and is formed by means of lamination onto the first decorated layer entirely following the direct and partial formation of the first decorated layer. Note that, as for a method of forming the first decorated layer directly onto the transparent layer's rear surface partially, it is preferable to use such a method as application like printing and coating, or two-color molding.

It is permissible that the present decorative member can comprise the first decorated layer that is disposed on the indented portions of the transparent layer's rear surface, or the first decorated layer that is disposed on the indent-free portions of the transparent layer's rear surface. When the first decorated layer is formed directly onto the indent-free portions of the transparent layer's rear surface partially, the second decorated layer displays indented decoration three-dimensionally, because the second decorated layer is shaped into such a configuration that coincides with or is die-symmetric to the indent-free portions of the transparent layer's rear surface. On the other hand, when the first decorated layer is formed directly onto the indented portions of the transparent layer's rear surface partially, the second decorated layer displays indent-free decoration three-dimensionally, because the second decorated layer is shaped into such a configuration that coincides with or is die-symmetric to the indented portions of the transparent layer's rear surface. In any of the second decorated layer's dispositions, forming the first decorated layer directly onto the transparent layer's rear surface partially makes it possible to inhibit the break or separation line that appears between the first decorated layer and the second decorated layer from deviating or displacing positionally. Thus, the present decorative member exhibits upgraded decorativeness. Note that, in the thickness-wise direction of decorative member, the greater the distance between the bottom surface of the indented portions and the top surface of the indent-free portions (hereinafter, referred to as an "irregularity difference between the indented and un-indented portions) is the more remarkably the present decorative member produces the advantage, namely, the effect of inhibiting the break or separation line from deviating or displacing positionally. Hence, the present decorative member, and the process for manufacturing the same are applicable to constitute or manufacture decorative members whose irregularity difference between the indented and indent-free portions is greater. For example, it is preferable that the present decorative member can have an irregularity difference between the indented and indent-free portions that is 1.3 mm or more, more preferably that falls in a range of from 2.0 to 4.5 mm.

Note that, in the present specification for describing the present decorative member and the present process for manufacturing decorative member, the phrase, "onto the first decorated layer and onto the rear surface of the transparent layer entirely," means "onto the first decorated layer and onto the rear surface of the transparent layer substantially entirely" as well. That is, in the present decorative member and process for manufacturing the same, it is allowable that the first decorated layer, and the rear surface of the transparent layer can partially comprise parts on which no second decorated layer is present or is laminated. For example, when the second decorated layer occupies the present decorative member in a considerably large proportion, the second decorated layer might be able to cover the entire first decorated layer at around the break or separation line that appears between the first decorated layer and the second decorated layer, even if no second decorated layer is laminated onto the first decorated layer partially. If such is the case, namely, even when the first decorated layer and the rear surface of the transparent layer are free from the laminated second decorated layer partially, it is possible to position the break or separation line with high reliability in the same manner as the case where the second decorated layer is laminated onto the first decorated layer and onto the rear surface of the transparent layer entirely. In other words, it is allowable to laminate the second decorated layer onto the first decorated layer and onto the rear surface of the transparent layer substantially entirely to such an extent that the second decorated layer covers the first decorated layer entirely at around the break or separation line at least. Note however that laminating the second decorated layer onto the first decorated layer and onto the rear surface of the transparent layer entirely produces such an advantage that it is possible for manufacturers to manufacture the present decorative member readily and highly accurately.

It is permissible that the present decorative member can further comprise layers other than the transparent layer, the first decorated layer and the second decorated layer. For example, it is permissible that the present decorative member can further comprise a substrate layer for covering the second decorated layer's rear surface. Moreover, it is permissible that the present decorative member can furthermore comprise a covering layer that is disposed between the second decorated layer and the substrate layer to cover the second layer's rear surface. When the present decorative member further comprises a substrate layer, it is also permissible to form the substrate layer's front surface as an irregular configuration that coincides with or is die-symmetric to the transparent layer's rear surface. In this instance, it is also permissible to shape the second decorated layer's rear surface into a configuration that coincides with or is die-symmetric to the substrate layer's front surface. That is, if such is the case, it is also permissible to form the second decorated layer onto the substrate layer's front surface by means of lamination. Even when the present decorative member comprises the substrate layer, the second decorated layer is formed as an irregular configuration that coincides with or is die-symmetric to the first decorated layer and the transparent layer's rear surface, and is disposed on the transparent layer's rear surface. Note that, when the second decorated layer is thus formed onto the substrate layer's front surface by means of lamination, the first decorated layer and the second decorated layer can be integrated by bonding a first integrated subassembly of the transparent layer and first decorated layer (hereinafter, referred to as a "foremost layer") and a second integrated subassembly of the substrate layer and second decorated layer (hereinafter, referred to as a "rearmost layer") by means of adhesion, for instance. In addition, when the second decorated layer is formed onto the foremost layer's rear surface by means of lamination, it is permissible to further form the substrate layer by means of injection molding onto the rear surface of the foremost layer with the second decorated layer being provided, namely, onto the second decorated layer's rear surface.

When the second decorated layer of the present decorative member is made of a film that comprises a vapor-deposited metallic layer and a resinous layer, it is preferable that the vapor-deposited metallic layer can be made of at least one of the following metallic materials: tin, indium, aluminum, zinc, gold, silver, copper, titanium, nickel and oxides thereof. Note that it is allowable naturally to select two or more members from the above metallic materials to use them in alloy forms. In order to enhance the present decorative member's decorativeness more, it is more preferable to select at least one member from the sub-group consisting of indium, gold and tin in the aforementioned metallic-material group to make the vapor-deposited metallic layer. Since these metallic materials are vapor deposited on the resinous layer in a dotted manner like fine islets, it is possible to inhibit the cracking of the vapor-deposited metallic layer, cracking which results from the second decorated layer that deforms to elongate, with much higher reliability. Moreover, in order to inhibit the vapor-deposited metallic layer from cracking much more reliably, it is preferable to control the formation of the vapor-deposited metallic layer so that it can have a thickness that falls in a range of from 5 nm or more to 80 nm or less before the lamination. Note that a more preferable prior-to-lamination thickness of the vapor-deposited metallic layer can fall in a range of from 35 nm or more to 65 nm or less.

Moreover, the resinous layer in the above-described preferable second decorated layer of the present decorative member can preferably be made of at least one of the following resinous materials: polyurethane, polymethylmethacrylate, acrylonitrile-butadiene-styrene copolymer, polycarbonate, polyethylene terephthalate, polypropylene, polyethylene and fluorocarbon resin. These resinous materials are likely to undergo elongation. Therefore, using these resinous materials to form the resinous layer makes it possible to highly accurately shape the second decorated layer's front surface into a configuration that coincides with or is die-symmetric to that of the first decorated layer, and that of the substrate layer's rear surface. In addition, in order to thus shape the second decorated layer's front surface with much higher accuracy, it is preferable to control the formation of the resinous layer so that it can have a thickness that falls in a range of from 5 μm or more to 300 μm or less before the lamination. Note that a more preferable prior-to-lamination thickness of the resinous layer can fall in a range of from 25 μm or more to 150 μm or less.

EXAMPLES

Hereinafter, decorative members according to the present invention, and processes for manufacturing the same will be described with reference to specific examples.

Example No. 1

Figure 1:
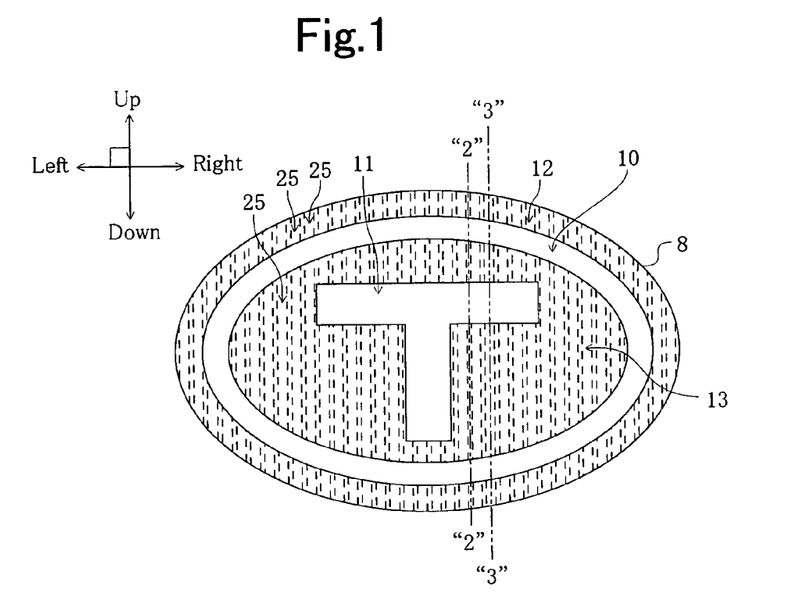
FIG. 1 is a front-view diagram for schematically illustrating a decorative member according to Example No. 1 of the present invention.
Figure 2:
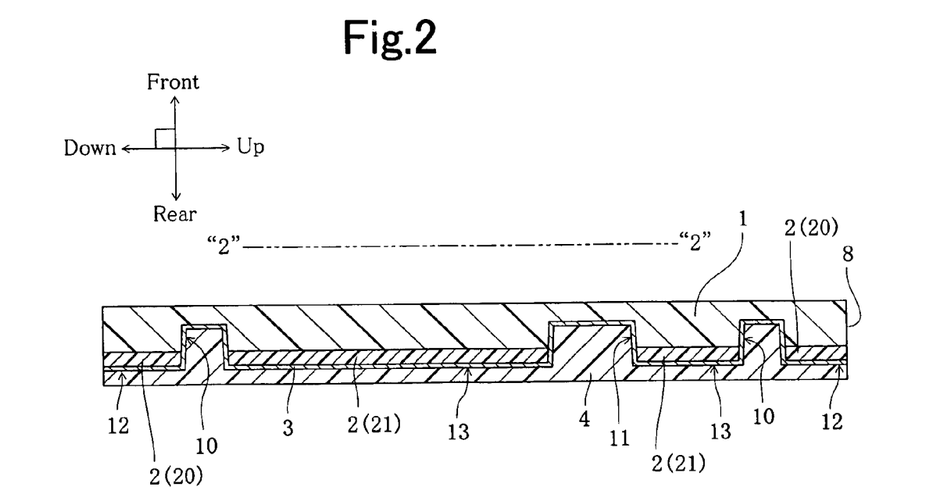
FIG. 2 is cross-sectional diagram for schematically illustrating the present decorative member according to Example No. 1 when it is cut with the imaginary chain double-dashed line "2"-"2" designated in FIG. 1.
Figure 3:
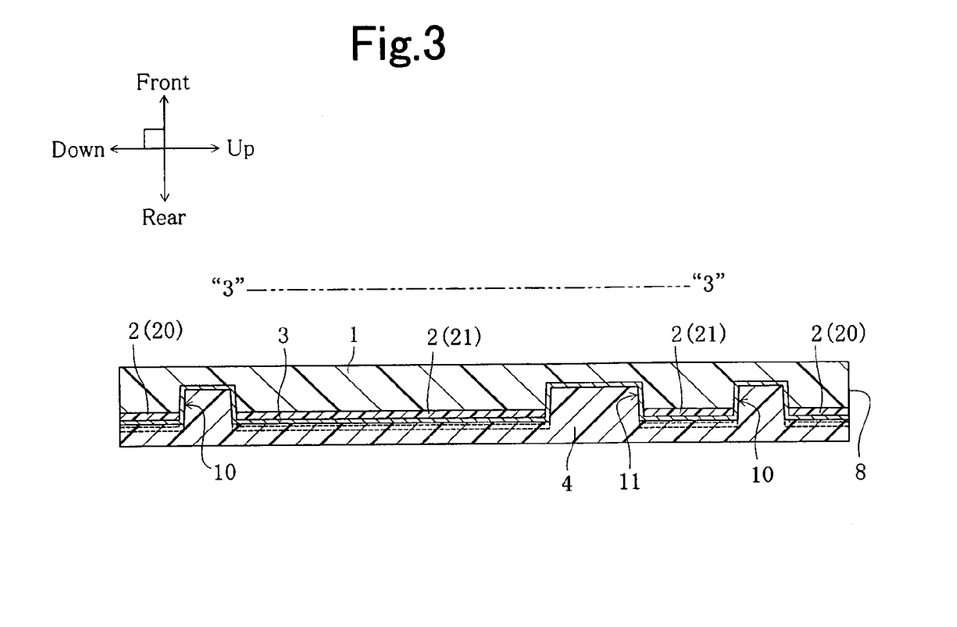
FIG. 3 is another cross-sectional diagram for schematically illustrating the present decorative member according to Example No. 1 when it is cut with the imaginary chain double-dashed line "3"-"3" designated in FIG. 1.
Figure 4:
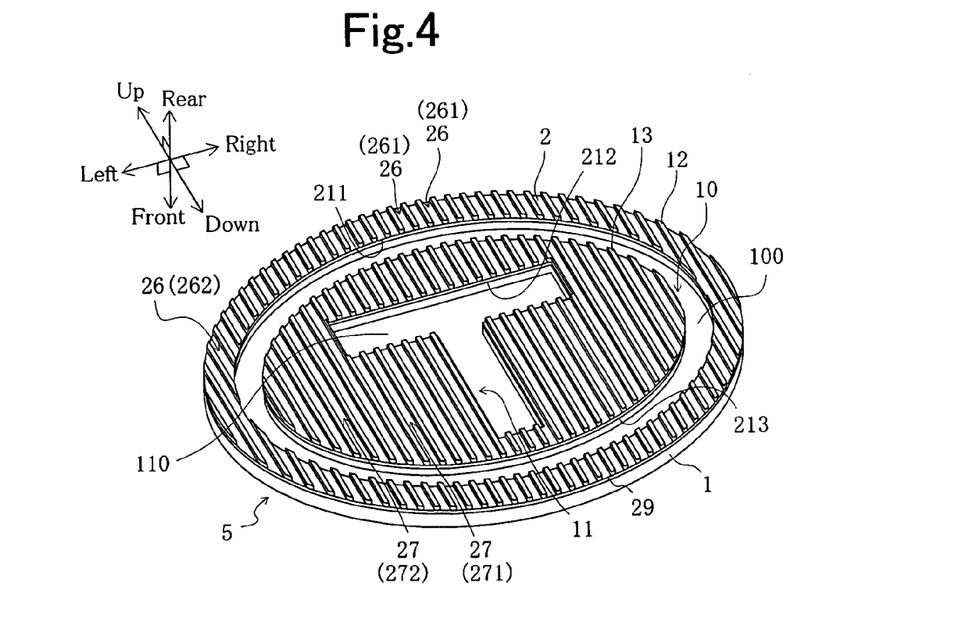
FIG. 4 is a perspective diagram for schematically illustrating a transparent layer and a first decorated layer that make a subassembly of the present decorative member according to Example No. 1.

A decorative member according to Example No. 1 of the present invention is directed to one of embodiments of the present invention in which the present decorative member is applied to making an emblem for automobile. Moreover, the present decorative member according to Example No. 1 is manufactured by a process for manufacturing decorative member according to the present invention that is further provided with above-described optional features (1) through (5). In addition, the present decorative member according to Example No. 1 further comprises above-described optional features (6) through (8). FIG. 1 shows the present decorative member according to Example No. 1 schematically in a front-view diagram. FIG. 2 shows the present decorative member according to Example No. 1 schematically in a cross-sectional diagram that is taken along the imaginary chain double-dashed line "2"-"2" designated in FIG. 1. FIG. 3 shows the present decorative member according to Example No. 1 schematically in another cross-sectional diagram that is taken along the imaginary chain double-dashed line "3"-"3" designated in FIG. 1. FIG. 4 shows a transparent layer and a first decorated layer, which make the present decorative member according to Example No. 1, schematically in a perspective diagram. FIGS. 5 through 9 show how to manufacture the present decorative member according to Example No. 1 schematically in an explanatory cross-sectional diagram, respectively. Note that the "up," "down," "right," "left," "front" and "rear" designations specified in FIGS. 1 through 4 will hereinafter indicate the up, down, right, left, front and rear directions in the present decorative member according to Example No. 1.

The present decorative member according to Example No. 1 comprises a transparent layer 1, a first decorated layer 2, a second decorated layer 3, and a substrate layer 4, as shown in FIGS. 2 and 3.

The transparent layer 1 is made from polycarbonate, one of transparent resinous materials. The transparent layer 1 has a rear surface that is formed as an irregular configuration. As illustrated in FIGS. 1 through 3, the transparent layer 1's rear surface is provided with an outer indented portion 10, and an inner indented portion 11. Specifically, the outer indented portion 10 is disposed on a diametrically outer side in the transparent layer 1's rear surface. The inner indented portion 11 is formed as a substantially letter-"T" shape, and is disposed on a diametrically inner side to the outer indented portion 10 in the transparent layer 1's rear surface. The outer indented portion 10 and inner indented portion 11 are formed as an indented shape that depresses toward the transparent layer 1's front surface, respectively. Moreover, the transparent layer 1's rear surface is provided with outer indent-free portions 12, and inner indent-free portions 13. Specifically, the outer indent-free portions 12 are disposed on a diametrically outer side to the outer indented portion 10 in the transparent layer 1's rear surface. The inner indent-free portions 13 are disposed in the sections that intervene between the outer indented portion 10 and the inner indented portion 11 in the transparent layer 1's rear surface. The outer indent-free portions 12 and inner indent-free portions 13 are formed as an indent-free shape that protrudes toward the transparent layer 1's rear surface, respectively. In addition, the present decorative member according to Example No. 1 comprises the outer indented portion 10, the inner indented portion 11, the outer indent-free portions 12 and the indent-free portions 13, which exhibit an irregularity difference between the indented portions and the indent-free portions that falls in a range of from 2.0 to 2.5 mm. Note, in the present specification, that the term, "irregular configuration," means jagged, notched or serrated configurations in which recessed parts and non-recessed parts occur alternately. Moreover, the recessed parts and non-recessed parts can be formed not only as rectangular shapes in the cross section like the outer and inner indented portions 10 and 11, and the outer and inner indent-free portions 12 and 13 in the transparent layer 1 of the present decorative member according to Example No. 1, but also as the other shapes such as trapezoid shapes, triangle shapes or round concave/concavity shapes in the cross section.

The first decorated layer 2 is made from a colored resinous material, for example, a mixture of polycarbonate and carbon black. The first decorated layer 2 is disposed directly on the transparent layer 2's rear surface, as illustrated in FIGS. 2 and 3. Specifically, the first decorated layer 2 is formed directly onto the outer indent-free portions 12, and onto the inner indent-free portions 13, by means of two-color molding, as shown in the drawings. Moreover, as specified in the drawings, the first decorated layer 2 that is disposed directly on the outer indent-free portions 12 will be hereinafter referred to as "outer first decorated layers 20," and the first decorated layer 2 that is disposed directly on the inner indent-free portions 13 will be hereinafter referred to as "inner first decorated layers 21." Moreover, as illustrated in FIG. 4, the outer first decorated layers 20 and inner first decorated layers 21 make a plurality of grooves, respectively. The respective grooves comprise apart of the first decorated layer 2's rear surface, depress toward the transparent layer 1, and extend in the up/down direction of the present decorative member according to Example No. 1. Hereinafter, as specified in FIG. 4, the grooves that the outer first decorated layers 20 make will be referred to as "outer grooves 26," and the grooves that the inner first decorated layers 21 make will be referred to as "inner grooves 27."

As can be seen from FIG. 4, some of the outer grooves 26 are connected to or communicated with the outer indented portion 10. Such outer grooves 26 will be hereinafter referred to as "first outer grooves 261," as specified in the drawing. Specifically, one of the opposite ends of the first outer grooves 261 opens to one of the end surfaces of the outer first decorated layers 20 that is disposed successively to the outer indented portion 10, as can be appreciated in FIG. 3. Such an end surface will be hereinafter referred to as a "first end surface 211," as specified in FIG. 4. The first outer grooves 261 are connected to or communicated with the outer indented portion 10, because the first end surfaces 211 are disposed successively to the outer indented portion 10, as can be appreciated from FIG. 3. Meanwhile, the other opposite end of the first outer grooves 261 is connected to or communicated with an outer peripheral end surface 8 of the present decorative member according to Example No. 1. Specifically, the other opposite end of the first outer grooves 261 opens to an outer peripheral end surface 29 of the outer first decorated layers 20, as can be appreciated from FIG. 3. Note herein that, in the present decorative member according to Example No. 1, the outer peripheral end surface 29 of the outer first decorated layers 20 makes the outer peripheral end surface 8 of the present decorative member, as shown in FIGS. 2 and 3. As a result, the other opposite end of the first outer grooves 261 is connected to or communicated with the present decorative member's outer peripheral end surface 8, as can be appreciated from FIG. 3. The outer grooves 26 other than the first outer grooves 261 are connected to or communicated with the present decorative member's outer peripheral end surface 8 alone, as shown in FIG. 4. Such outer grooves 26 will be hereinafter referred to as "second outer grooves 262," as specified in the drawing.

In addition, as can be also seen from FIG. 4, some of the inner grooves 27 are connected to or communicated with the inner indented portion 11. Such inner grooves 27 will be hereinafter referred to as "first inner grooves 271," as specified in the drawing. Specifically, one of the opposite ends of the first inner grooves 271 opens to one of the end surfaces of the inner first decorated layers 21 that is disposed successively to the inner indented portion 11, as can be appreciated from FIG. 3. Such an end surface will be hereinafter referred to as a "second end surface 212," as specified in FIG. 4. The first inner grooves 271 are connected to or communicated with the inner indented portion 11, because the second end surfaces 212 are disposed successively to the inner indented portion 11, as can be appreciated from FIG. 3. Meanwhile, the other opposite end of the second inner grooves 271 is connected to or communicated with the outer indented portion 10. Specifically, the other opposite end of the second inner grooves 271 opens to one of the end surfaces of the inner first decorated layers 21 that is disposed successively to the outer indented portion 10, as can be seen from FIG. 3. Such an end surface will be hereinafter referred to as a "third end surface 213," as specified in FIG. 4. The first inner grooves 271 are connected to or communicated with the outer indented portion 10, because the third end surfaces 213 are disposed successively to the outer indented portion 10, as can be appreciated from FIG. 3. The inner grooves 27 other than the first inner grooves 271 are connected to or communicated with the outer indented portion 10 alone, as shown in FIG. 4. Such outer grooves 27 will be hereinafter referred to as "second inner grooves 272," as specified in the drawing. Note that the thus made subassembly of the transparent layer 1 and first decorated layer 2 will be hereinafter referred to as a "foremost layer 5," as specified in the drawing.

As illustrated in FIGS. 5 through 8, the second decorated layer 3 is made of a film, and comprises a resinous layer 30 and a vapor-deposited metallic layer 31. The resinous layer 30 is made from polymethlymethacrylate (PMMA). The vapor-deposited metallic layer 31 is made from indium, and is formed on the resinous layer 30 by means of vapor deposition. Prior to being laminated on the foremost layer 5, that is, the subassembly of the transparent layer 1 and first decorated layer 2, the second decorated layer 3 comprises the resinous layer 30 whose thickness is 125 μm, and the vapor-deposited metallic layer 31 whose thickness is 60 nm. Note that the second decorated layer 3 is laminated on the rear surface of the transparent layer 1 and on the first decorated layer 2 entirely while the vapor-deposited metallic layer 31 is disposed to face toward the transparent layer 1.

The substrate layer 4 is made from acrylonitrile-ethylene-styrene resin (AES), and is formed on the rear surface of the second decorated layer 3 by means of injection molding. As illustrated in FIGS. 2 and 3, the substrate layer 4 goes into the inside of the outer indented portion 10 of the transparent layer 1, and into the inside of the inner indented portion 11. Moreover, as can be understood from FIG. 4, the substrate layer 4 also goes into the inside of the outer grooves 26 in the outer first decorated layers 20, and into the inside of the inner grooves 27 in the inner first decorated layers 21. Thus, the substrate layer 4 has a front surface that is formed as an irregular shape being substantially complementary to that of the rear surface of the foremost layer 5, that is, as an irregular shape that coincides with or is die-symmetric to the rear surface of the subassembly of the transparent layer 1 and first decorated layer 2.

A process for manufacturing the decorative member according to Example No. 1 of the present invention will be hereinafter described in detail.

(a) Step of Forming Foremost Layer

First of all, a not-shown two-color molding die was prepared. The transparent layer 1, and the first decorated layer 2 were two-color molded by means of usual two-color molding method. Thus, this step produced the foremost layer 5 that comprised the transparent layer 1 and the first decorated layer 2, as shown in FIG. 4.

(b) Step of Forming Second Decorated Layer

Figure 5:
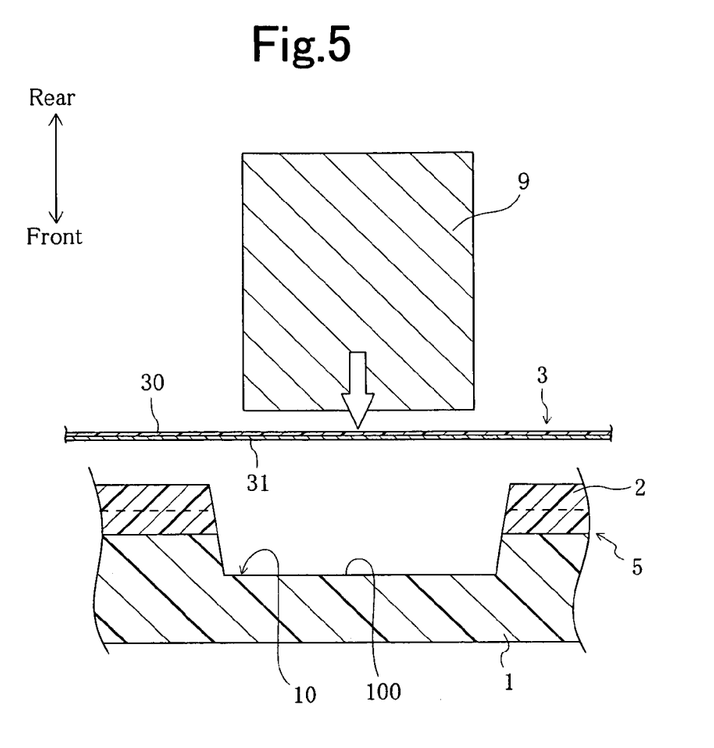
FIG. 5 is an explanatory cross-sectional diagram for schematically illustrating how the present decorative member according to Example No. 1 is manufactured.

A shaping jig 9 was prepared. Note that the shaping jig 9 had such a configuration that comprised an indent-free portion and an indented portion that coincided with or were die-symmetrical to the outer indented portion 10 and inner indented portion 11 of the transparent layer 1's rear surface. Then, the foremost layer 5 being made at the foremost-layer forming step, the second decorated layer 3 being made of the above-described film, and the shaping jig 9 were put into a not-shown compression/vacuum chamber. As illustrated in FIG. 5, the second decorated layer 3 was placed over the foremost layer 5 so as to cover the rear surface of the foremost layer 5 in the compression/vacuum chamber; and then the shaping jig 9 was placed over the second decorated layer 3 so as to cover the rear surface of the second decorated layer 3 therein. In this instance, the vapor-deposited metallic layer 31 of the second decorated layer 3 was put in place on the front side, that is, on one of the opposite sides facing the foremost layer 5; and the resinous layer 30 was put in place on the rear surface, that is, on the other of the opposite sides not facing the foremost layer 5. Moreover, the shaping jig 9 was put in place so as to face the outer indented portion 10 and inner indented portion 11.

Figure 6:
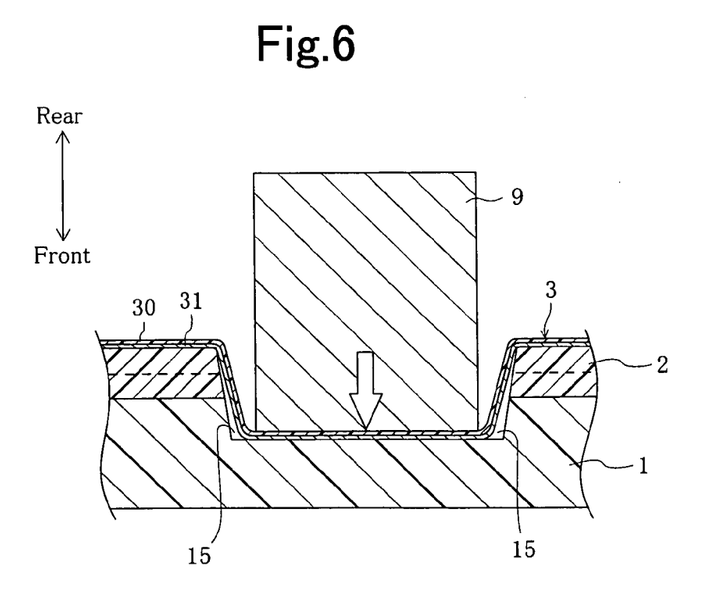
FIG. 6 is another explanatory cross-sectional diagram for schematically illustrating how the present decorative member according to Example No. 1 is manufactured.
Figure 7:
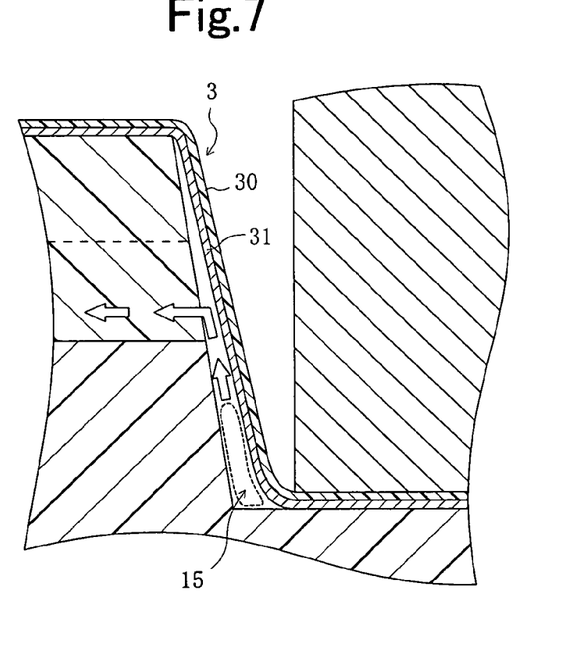
FIG. 7 is still another explanatory cross-sectional diagram for schematically illustrating how the present decorative member according to Example No. 1 is manufactured.

Then, as illustrated in FIG. 6, the shaping jig 9 was moved forward to press the second decorated layer 3 onto the foremost layer 5, thereby laminating the second decorated layer 3 on the foremost layer 5. During the pressing operation, the second decorated layer 3 was brought into press contact with the outer indented portion 10's bottom surface 100, and with the inner indented portion 11's bottom surface 110. Note that, in this instance, the second decorated layer 3 did not come in press contact with the following sections: the sections adjacent to the outer indent-free portions 12 in the outer indented portion 10; the sections adjacent to the inner indent-free portions 13 in the outer indented portion 10; and the sections adjacent to the inner indent-free portions 13 in the inner indented portion 11. These sections will be hereinafter referred to as indented boundary sections 15 all together. To put it differently, as shown in FIG. 6, the indented boundary sections 15 made inner empty spaces between the foremost layer 5, namely, the transparent layer 1 and/or the first decorated layer 2, and the second decorated layer 3. Thus, air remained in the resulting inner empty spaces. Likewise, as can be seen from FIG. 4, inner empty spaces in which air remained were formed between the foremost layer 5, namely, the transparent layer 1 and/or the first decorated layer 2, and the second decorated layer 3, inside the outer grooves 26 and inside the inner grooves 27.

Figure 8:
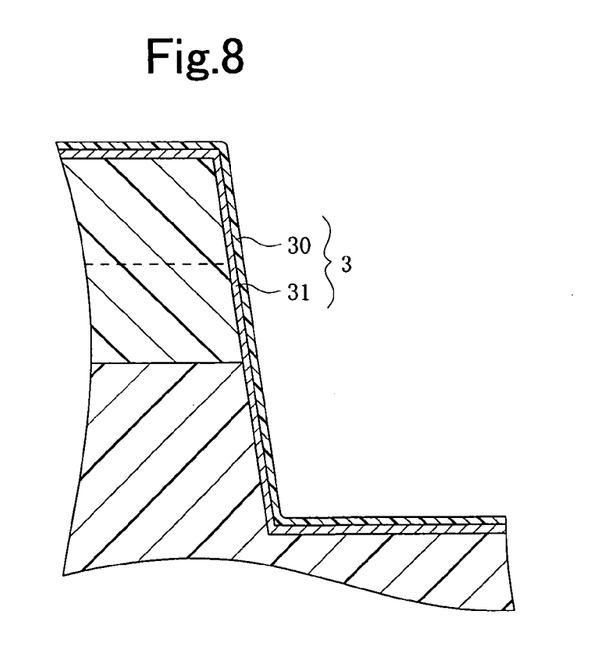
FIG. 8 is still another explanatory cross-sectional diagram for schematically illustrating how the present decorative member according to Example No. 1 is manufactured.
Figure 9:
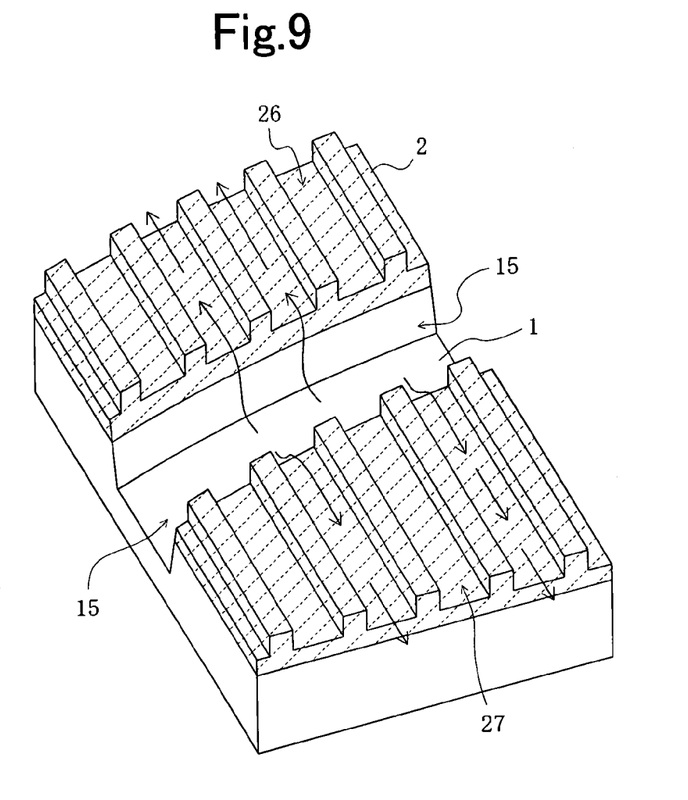
FIG. 9 is an explanatory perspective diagram for schematically illustrating how the present decorative member according to Example No. 1 is manufactured.

Following the press lamination operation, a not-shown compressor is actuated to blow air into the compression/vacuum chamber, thereby increasing the pressure inside the compression/vacuum chamber. Accordingly, the second decorated layer 3 came in press contact with the inner indented portion 11 and outer indented portion 10. Then, as illustrate in FIG. 9, the air that remained in the inner empty spaces between the transparent layer 1 and the second decorated layer 3 (not shown in the drawing) adjacent to the indented boundary sections 15 moved to the outer grooves 26, or to the inner grooves 27. Consequently, the second decorated layer 3 adhered closely to the inner indented portion 11, and to the outer indented portion 10. Moreover, the following remaining air, that is, the air that had remained in the inner empty spaces between the transparent layer 1 and the second decorated layer 3 adjacent to the indented boundary sections 15 and then moved to the outer grooves 26, or to the inner grooves 27; and the air that had remained in the inner empty spaces between the transparent layer 1 and the second decorated layer 3 inside the outer grooves 26 or the inner grooves 27, passed through the outer grooves 26 or the inner grooves 27, and was then discharged to the outside of the first decorated layer 2, namely, to the outside of the integral assembly of the foremost layer 5 and second decorated layer 3, from out of the outer peripheral end of the first decorated layer 2. Therefore, the second decorated layer 3 was shaped into such a configuration that conformed not only to the rear surface of the first decorated layer 2 but also to that of the transparent layer 1. As a result, the second decorated layer 3 adhered closely not only to the rear surface of the first decorated layer 2 but also to that of the transparent layer 1 entirely. Thus, the second-decorated-layer forming step produced the second decorated layer 3 that comprised the film that was laminated entirely on the rear surface of the first decorated layer 2 as well as on that of the transparent layer 1, as shown in FIG. 8.

(c) Step of Forming Substrate Layer

The foremost layer 5 with the second decorated layer 3 being laminated entirely was put in place in a cavity of not-shown die for molding substrate layer. Then, the substrate layer 4 was laminated onto the rear surface of the second decorated layer 3 by means of injection molding, specifically, by means of so-called film in-molding. As a result, the substrate layer 4 entered inside the outer indented portion 10, and inside the inner indented portion 11. Moreover, the substrate layer 4 went into the inside of the outer grooves 26, and into the inside of the inner grooves 26. Thus, the front surface of the substrate layer 4 was formed as an irregular configuration that was substantially complementary to or coincided with that of the rear surface of the foremost layer 5, that is, the rear surface of the first decorated layer 2 and the rear surface of the transparent layer 1.

The above-described three forming steps completed the decorative member according to Example No. 1 of the present invention that comprised the transparent layer 1, the first decorated layer 2, the second decorated layer 3, and the substrate layer 4. The decorative member according to Example No. 1 of the present invention displayed the following decorations: a first decoration that resulted from the first decorated layer 2, namely, an indented decoration with black color; and a second decoration that resulted from the second decorated layer 3, namely, an indent-free decoration with metallic color.

The manufacturing process for decorative member according to Example No. 1 of the present invention employed the two-color molding in which the first decorated layer 2 was formed directly onto the rear surface of the transparent layer 1. Accordingly, the present decorative member according to Example No. 1 could comprise the first decorated layer 2 that was inhibited from deviating or displacing positionally. Consequently, the present decorative member according to Example No. 1 could exhibit the break or separation lines, which were inhibited from deviating or displacing positionally, between the first decorated layer 2 and the second decorated layer 3, especially, between the decorated layer 2 and the vapor-deposited metallic layer 31 of the second decorated layer 3.

Moreover, not only the vapor-deposited metallic layer 31 made a part of the second decorated layer 3 that comprised the film, but also was laminated on the rear surface of the first decorated layer 2 and on that of the transparent layer 1. Accordingly, it was unnecessary to directly vapor deposit the vapor-deposited metallic layer 31 onto the transparent layer 1. That is, it was not needed to put the transparent layer 1 into a vacuum chamber that was designed especially for vapor deposition. Consequently, the work efficiency upgraded at the step of forming or laminating the vapor-deposited layer metallic layer 31 onto the transparent layer 1, thereby enabling manufacturers to manufacture decorative members with ease.

In addition, the second decorated layer 3 was formed entirely on the rear surface of the first decorated layer 2 and on the rear surface of the transparent layer 1 by means of lamination. As a result, even if the second decorated layer 3 underwent elongation deformation when laminating the second decorated layer 3 onto the first decorated layer 2 and onto the transparent layer 1, namely, when shaping the second decorated layer 3 into an irregular configuration that coincided with or was die-symmetric to the rear surface of the transparent layer 1 and that of the first decorated layer 2, the break or separation lines, which appeared between the first decorated layer 2 and the second decorated layer 3, were hardly deviated or displaced positionally. That is, when shaping the second decorated layer 3 as above, the break or separation lines, which appeared between the first decorated layer 2 and the vapor-deposited metallic layer 31, were hardly deviated or displaced positionally.

Moreover, indium that can be vapor deposited like fine islets in a dotted manner was selected as a material that made the vapor-deposited metallic layer 31 of the second decorated layer 3. Therefore, the selection made it possible to inhibit the vapor-deposited metallic layer 31 from cracking when the second decorated layer 3 deformed to elongate.

In addition, the selection of polymethylmethacrylate (PMMA), which is good in terms of elongating deformability, as a material for making the resinous layer 30 of the second decorated layer 3 enabled manufacturers to highly accurately shape the second decorated layer 3 into a configuration that coincided with or was die-symmetric to the rear surface of the first decorated layer 2 and that of the transparent layer 1.

Moreover, molding the first decorated layer 2 onto the transparent layer 1 by means two-color molding made it possible not only to position the first decorated layer 2 with ease and with high accuracy, but also to integrate the transparent layer 1 with the first decorated layer 2 with high reliability.

In addition, the rear surface of the first decorated layer 2 was provided with the outer grooves 26 some of which were connected to or communicated with the outer indented portion 10 (i.e., the first outer grooves 261) as well as the inner grooves 27 some of which were connected to or communicated with the inner indented portion 11 (i.e., the first inner grooves 271). Accordingly, it was possible for manufacturers to highly reliably remove the air that remained between the transparent layer 1 and the second decorated layer 3. In addition to the above advantageous operation, it was possible for a manufacturing worker or robot to discharge the air that remained between the transparent layer 1 and the second decorated layer 3 to the outside of the first decorated layer 2, namely, to the outside of the present decorative member according to Example No. 1, through the outer grooves 26 and inner grooves 27. Consequently, the present manufacturing process for decorative member according to Example No. 1 enabled the manufacturing worker or robot to get rid of the air that remained between the transparent layer 1 and the second decorated layer 3 with much higher reliability.

All in all, the present manufacturing process for decorative member according to Example No. 1 enables manufacturers to readily manufacture decorative members that demonstrate good decorativeness. Thus, the present decorative member according to Example No. 1 is not only good in terms of decorativeness but also can be manufactured inexpensively.

As described above, the present decorative member according to Example No. 1 comprises the two-color molded first decorated layer 2, or the present manufacturing process for decorative member according to Example No. 1 comprises the step of two-color molding the first decorated layer 2. However, it is allowable to form the first decorated layer 2 by means of screen printing, for instance. If such is the case, it is also allowable to provide the rear surface of the transparent layer 1 with grooves, which are made similarly to the outer grooves 26 and inner grooves 27 in the present decorative member according to Example No. 1, at the sections that are placed in front of the first decorated layer 2.

The second decorated layer 3 making the present decorative member according to Example No. 1 can be constructed as a single-layered structure or a multi-layered structure. Moreover, the second decorated layer 3 can be made of a material that is free from any metal or pigment. In addition, when the present decorative member according to Example No. 1 comprises a second decorated layer 3 one of whose opposite surfaces is provided with fine irregularity, for example, so-called frosted or grounded glass-shaped surface, it is possible to give satin-like glossiness to the decoration that the second decorated layer 3 displays.

When manufacturers would like to use a second decorated layer 3 that contains metal, it is preferable to use a second decorated layer 3 that is made as described below. That is, the second decorated layer 3 can preferably comprise a resinous layer 30 that exhibits good elongation deformability, and a vapor-deposited metallic layer 31 on which a metal is vapor deposited like islets in a dotted manner. As for such a second decorated layer 3, it is possible to employ a vapor-deposited laminated product that is disclosed in Japanese Unexamined Patent Publication (KOKAI) Gazette No. 2007-216,608, for instance. When using such a second decorated layer 3, it is allowable to further color the resinous layer 30 proper of the second decorated layer 3. Moreover, when indium is selected to make the vapor-deposited metallic layer 31 of such a second decorated layer 3, for instance, the resulting vapor-deposited metallic layer 31 displays yellow, which results from indium per se, in addition to the metallic glossiness of indium. If manufacturers do not prefer the yellow color arising from indium, it is possible for the manufacturers to cancel the color by compounding a trace amount of blue pigment in a material for making the resinous layer 30.

In addition to the resinous layer 30 and vapor-deposited metallic layer 31, it is allowable that the second decorated layer 3 can further comprise the other layer. Note that, although it is possible to name the following as the other layer, the other layer is not limited to the following: a reinforcement layer for reinforcing the second decorated layer 3; a protective layer for protecting the vapor-deposited metallic layer 31; and a bonding layer for bonding the second decorated layer 3 onto the transparent layer 1. Like the second decorated layer 3, it is allowable that the transparent layer 1 making the present decorative member according to Example No. 1 can similarly comprise a single-layered structure, or a multi-layered structure.

Example No. 2

Figure 10:
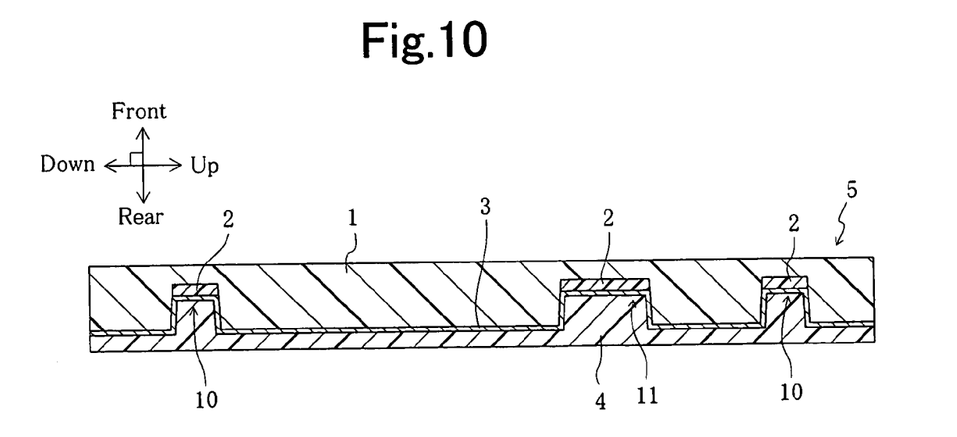
FIG. 10 is cross-sectional diagram for schematically illustrating a decorative member according to Example No. 2 of the present invention when it is cut with an imaginary chain double-dashed line that is equivalent to the imaginary chain double-dashed line "2"-"2" designated in FIG. 1.

A decorative member according to Example No. 2 of the present invention comprises the same constituent elements as those of the present decorative member according to Example No. 1, except that the first decorated layer is formed only on the bottom surfaces of the inner and outer indented portions of the transparent layer, and that the first decorated layer is free from the grooves that are connected to or communicated with the inner and outer indented portions. Moreover, the present decorative member according to Example No. 2 is manufactured by a process for manufacturing decorative member according to the present invention that is further provided with above-described optional features (1) and (2). In addition, the present decorative member according to Example No. 2 further comprises above-described optional feature (6). FIG. 10 shows the present decorative member according to Example No. 2 schematically in a cross-sectional diagram. In the drawing, the present decorative member according to Example No. 2 is cut with an imaginary chain double-dashed line that is equivalent to the chain double-dashed line "2"-"2" designated in FIG. 1. Note that the "up," "down," "front" and "rear" designations specified in FIG. 10 will hereinafter indicate the up, down, front and rear directions in the present decorative member according to Example No. 2.

As illustrated in FIG. 10, the present decorative member according to Example No. 2 comprises a transparent layer 1, first decorated layers 2, a second decorated layer 3, and a substrate layer 4 in the same manner as the present decorative member according to Example No. 1. The transparent layer 1 is formed as the same configuration as that of the present decorative member according to Example No. 1. The first decorated layers 2 are formed by means of two-color molding on the bottom surfaces of the outer indented portion 10 and inner indented portion 11 alone. The second decorated layer 3 is formed on the rear surface of the transparent layer 1, and on the rear surfaces of the first decorated layers 2 entirely. Thus, when a user or viewer sees the present decorative member according to Example No. 2 on the front side, he or she appreciates that the vapor-deposited metallic layer 31 making the second decorated layer 3 displays an indented configuration three-dimensionally. Meanwhile, the user or viewer appreciates that the first decorated layers 2 display an indent-free or protruded configurations three-dimensionally, respectively. In the present decorative member according to Example No. 2, note that the first decorated layers 2 and transparent layer 1 are not provided with any grooves. Moreover, the present decorative member according to Example No. 2 has an irregularity difference between the indented portions and the indent-free portions that ranges from 2.0 to 2.2 mm.

The present decorative member according to Example No. 2 comprises the first decorated layers 2 and transparent layer 1 that do not have any grooves being connected to or communicated with the inner indented portion 11 and outer indented portion 10. Accordingly, air might possibly remain between the first decorated layers 2 and the second decorated layer 3 at around the indented sections inside the inner indented portion 11 and outer indented portion 10 when laminating the second decorated layer 3 onto the rear surface of the foremost layer 5 in the manufacture of the present decorative member according to Example No. 2. However, the first decorated layers 2 are formed directly on the rear or bottom surface of the outer indented portion 10, and on the rear or bottom surface of the inner indented portion 11. Consequently, even if air should have remained at around the indented sections inside the inner indented portion 11 and outer indented portion 10, the first decorated layers 2 obstruct or interrupt the remaining air and makes it invisible to a user or viewer in front of the front surface of the present decorative member according to Example No. 2. Therefore, the present decorative member according to Example No. 2 demonstrates good decorativeness, though it is free from the grooves that are connected to or communicated with the inner indented portion 11 and outer indented portion 10 of the transparent layer 1. Moreover, the present process for manufacturing decorative member according to Example No. 2 comprises the steps of: forming the first decorated layers 2 directly onto the rear surface of the transparent layer 1; and forming the second decorated layer 3, which comprises a film, onto the rear surface of the transparent layer 1, and onto the rear surfaces of the first decorated layers 2 entirely by means of lamination. Hence, the present process for manufacturing decorative member according to Example No. 2 enables manufacturers to readily manufacture the present decorative member according to Example No. 2 with good decorativeness.

Example No. 3

Figure 11:
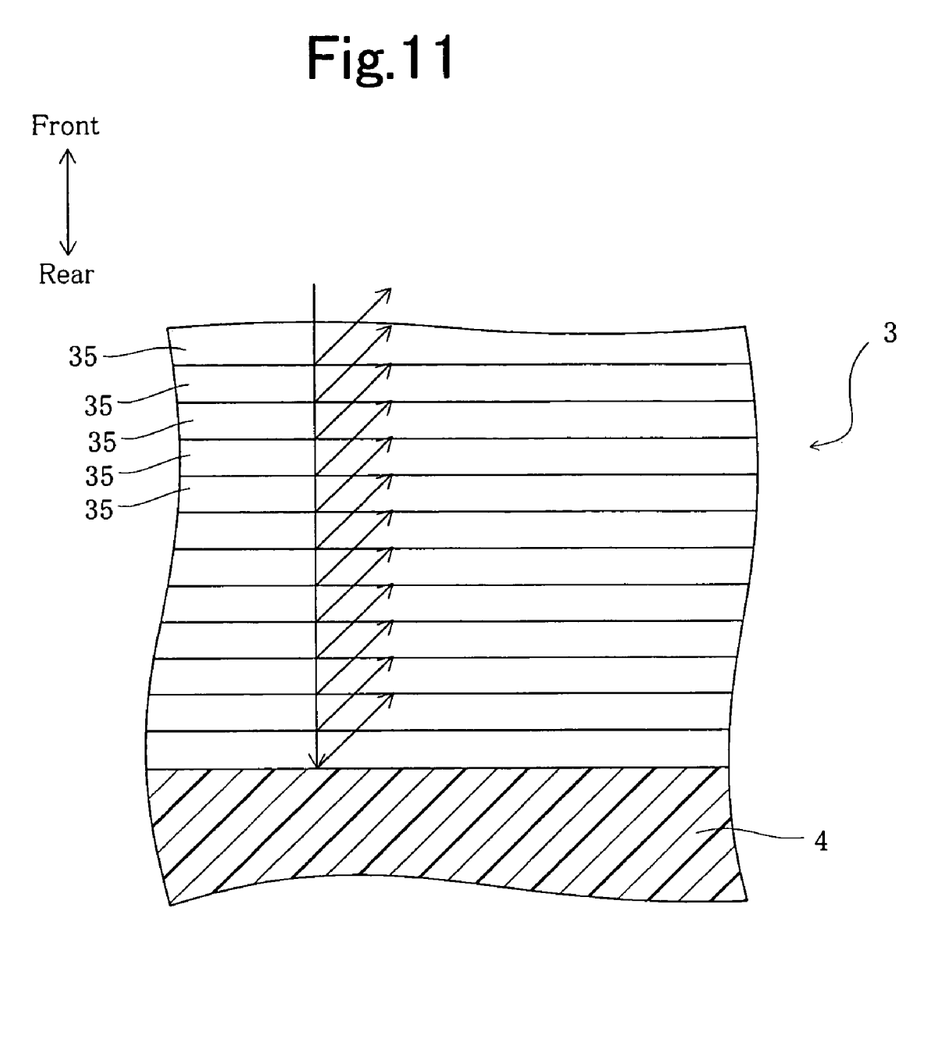
FIG. 11 is an explanatory cross-sectional diagram for schematically illustrating a second decorated layer that makes a decorative member according to Example No. 3 of the present invention.

A decorative member according to Example No. 3 of the present invention is directed to one of embodiments of the present invention in which the present decorative member is applied to making an electromagnetic-wave transmissive cover for automobile. The present decorative member according to Example No. 3 comprises the same constituent elements as those of the present decorative member according to Example No. 1, except that the second decorated layer is made of a different material from that makes the present decorative member according to Example No. 1's second decorated layer 3. Moreover, the present decorative member according to Example No. 3 is manufactured by a process for manufacturing decorative member according to the present invention. Specifically, a process for manufacturing decorative member according to Example No. 3 of the present invention is further provided with above-described optional features (3) through (5). In addition, the present decorative member according to Example No. 3 further comprises above-described optional features (7) and (8). FIG. 11 illustrates the present decorative member according to Example No. 3's second decorated layer schematically in an explanatory cross-sectional diagram.

The present decorative member according Example No. 3 comprised a second decorated layer 3, which was made using "PICASUS" (trademark) that was produced by TORAY Co., Ltd. The second decorated layer 3 was formed as a multi-layered structure, and did not contain any metal and pigment. To be specific, as illustrated in FIG. 11, the second decorated layer 3 comprised a plurality of laminated resinous layers 35 whose thickness was from 50 to 100 μm approximately in a quantity of 100 layers or more. In the second decorated layer 3, the neighboring resinous layers 35 exhibited optical refractive indexes that differed to each other. Accordingly, the second decorated layer 3 gave rise to color structurally, and then displayed metallic glossiness. Consequently, although the present decorative member according to Example No. 3 was free from any metal, it displayed decorativeness that took on metallic color that arose from the second decorated layer 3. Thus, the present decorative member according to Example No. 3 demonstrated such good electromagnetic-wave transmissibility that it was suitable for making electromagnetic-wave transmissive covers for automobile.

Note that the present process for manufacturing decorative member according to Example No. 3 made it possible to readily manufacture decorative members with good decorativeness in the same manner as the present manufacturing process according to Example No. 1 did. Moreover, not only the present decorative member according to Example No. 3 could likewise demonstrate good decorativeness as the present decorative member according to Example No. 1 did, but also it could be manufactured inexpensively.

Having now fully described the present invention, it will be apparent to one of ordinary skill in the art that many changes and modifications can be made thereto without departing from the spirit or scope of the present invention as set forth herein including the appended claims.

What is claimed is:

1. A process for manufacturing decorative member, the decorative member comprising:
   a transparent layer having opposite front and rear surfaces;
   a first decorated layer being disposed on the rear surface of the transparent layer; and
   a second decorated layer being disposed on the rear surface of the transparent layer;
   the process comprising steps of:
   forming the rear surface of the transparent layer as an irregular configuration that comprises indented portions denting toward the front surface of the transparent layer and indent-free portions protruding away from the front surface of the transparent layer;
   forming the first decorated layer directly onto at least a part of the indent-free portions of the rear surface of the transparent layer by two-color molding, a rear surface of the first decorated layer having a groove extending transversely relative to the front surface of the transparent layer, a thickness of the groove being smaller than a thickness of non-grooved portions of the first decorated layer, the groove extending to and opening into at least one of the indented portions of the rear surface of the transparent layer; and
   making the second decorated layer of a film that comprises resin, and then forming the second decorated layer by laminating the resulting film onto the first decorated layer and onto the rear surface of the transparent layer entirely.

2. The process according to claim 1, wherein:
   the second decorated layer is made of a film that comprises a resinous layer, and a vapor-deposited metallic layer being disposed on the resinous layer;

the vapor-deposited metallic layer comprises at least one member that is selected from the group consisting of tin, indium, aluminum, zinc, gold, silver, copper, titanium, nickel and oxides thereof; and the resinous layer comprises at least one member that is selected from the group consisting of polyurethane, polymethylmethacrylate, acrylonitrile-butadiene-styrene copolymer, polycarbonate, polyethylene terephthalate, polypropylene, polyethylene and fluorocarbon resin.

3. The process according to claim 2, wherein, before being laminated onto the first decorated layer and onto the rear surface of the transparent layer, the second decorated layer comprises:

the vapor-deposited metallic layer whose thickness is from 5 nm or more to 80 nm or less; and the resinous layer whose thickness is from 5 µm or more to 300 µm or less.

4. The process according to claim 1, wherein:

the decorative member further comprises an outer-periphery end surface; and the groove in the rear surface of the first decorated layer and is further connected to the outer-periphery end surface of the decorative member at the step of forming the first decorated layer.

5. The process according to claim 1, wherein the step of making and then forming the second decorated layer comprises the steps of:

press contacting at least the transparent layer and the film making the second decorated layer with each other; and moving gas, which remains between the transparent layer and the second decorated layer to inside of the one of the indented portions of the rear surface of the transparent layer and to inside the groove in the rear surface of the first decorated layer.

6. The process according to claim 1, wherein the indented portions of the rear surface of the transparent layer are free of the first decorated layer.

7. The process according to claim 1, wherein the step of forming the second decorated layer includes moving gas trapped between the transparent layer and the second decorated layer into the groove of the first decorated layer.

8. A process for manufacturing a decorative member, the decorative member comprising:

a transparent layer having opposite front and rear surfaces;

a first decorated layer being disposed on the rear surface of the transparent layer; and a second decorated layer being disposed on the rear surface of the transparent layer;

the process comprising steps of:

forming the rear surface of the transparent layer with indented portions and indent-free portions, the indented portions having a first thickness and the indent-free portions having a thickness greater that the first thickness of the indented portions;

forming the first decorated layer being onto at least a part of the indent-free portions of the rear surface of the transparent layer by two-color molding, the first decorated layer having a grooved portion and non-grooved portion, the grooved portion of the first decorated layer having a thickness smaller than the non-grooved portion of the first decorated layer, and a groove of the grooved portion intersecting and communicating with at least one of the indented portions of the rear surface of the transparent layer; and making the second decorated layer of a film that comprises resin, and then forming the second decorated layer by laminating the resulting film onto the first decorated layer and onto the entire rear surface of the transparent layer and moving gas trapped between the transparent substrate and the second decorated layer into the groove of the first decorated layer and then into the at least one of the indented portions of the rear surface of the transparent layer.

9. The process according to claim 8, wherein:

the second decorated layer is made of a film that comprises a resinous layer, and a vapor-deposited metallic layer being disposed on the resinous layer;

the vapor-deposited metallic layer comprises at least one member selected from the group consisting of tin, indium, aluminum, zinc, gold, silver, copper, titanium, nickel and oxides thereof; and the resinous layer comprises at least one member selected from the group consisting of polyurethane, polymethylmethacrylate, acrylonitrile-butadiene-styrene copolymer, polycarbonate, polyethylene terephthalate, polypropylene, polyethylene and fluorocarbon resin.

10. The process according to claim 9, wherein, before being laminated onto the first decorated layer and onto the rear surface of the transparent layer, the second decorated layer comprises:

the vapor-deposited metallic layer having a thickness is from 5 µm or more to 80 µm or less; and the resinous layer having a thickness is from 5 µm or more to 300 µm or less.

11. The process according to claim 8, wherein:

the decorative member further comprises an outer-periphery end surface; and the groove is formed in a rear surface of the first decorated layer and is further connected to an outer-periphery end surface of the decorative member at the step of forming the first decorated layer.

* * * * *